United States Patent [19]
Kusama et al.

[11] Patent Number: 5,662,348
[45] Date of Patent: Sep. 2, 1997

[54] SUSPENSION ARM

[75] Inventors: Eiichi Kusama, Anjo; Toru Kawamura; Yukikazu Ueno, both of Toyota; Hiroyuki Nishi, Takahama; Yoshihisa Kato, Nishikamo-gun, all of Japan

[73] Assignee: Toyota Jidosha Kabushiki Kaisha, Aichi-ken, Japan

[21] Appl. No.: 619,888

[22] Filed: Mar. 20, 1996

[30] Foreign Application Priority Data

| Mar. 23, 1995 | [JP] | Japan | 7-064088 |
| Aug. 29, 1995 | [JP] | Japan | 7-220803 |

[51] Int. Cl.⁶ .......................................... B60G 3/00
[52] U.S. Cl. ........................... 280/688; 280/96.1
[58] Field of Search ........................ 280/688, 660, 280/96.1, 674, 787

[56] References Cited

U.S. PATENT DOCUMENTS

| 4,761,019 | 8/1988 | Dubensky | 280/674 |
| 4,817,973 | 4/1989 | Takeda | 280/781 |
| 5,236,209 | 8/1993 | Lipiccolo | 280/96.1 |
| 5,362,090 | 11/1994 | Takeuchi | 280/660 |
| 5,516,129 | 5/1996 | Kurosu et al. | 280/96.1 |
| 5,516,130 | 5/1996 | Mitchell | 280/96.1 |

FOREIGN PATENT DOCUMENTS

| 1-0546610 | 6/1993 | European Pat. Off. . |
| 1-0546612 | 6/1993 | European Pat. Off. . |
| 61-57009 U | 4/1986 | Japan . |
| 2-001918 | 2/1979 | United Kingdom . |
| 2-063783 | 6/1981 | United Kingdom . |

*Primary Examiner*—Kenneth R. Rice
*Attorney, Agent, or Firm*—Oliff & Berridge

[57] ABSTRACT

In a suspension arm formed by press working a plate-shaped member, in a case in which, while a vehicle is traveling, a load is inputted to the suspension arm in a direction intersecting a direction in which the suspension arm swings, at least a region at which a maximum stress is generated is a non-end portion of the plate-shaped member. Accordingly, high rigidity can be ensured without an increase in weight.

36 Claims, 16 Drawing Sheets

F I G. 3A
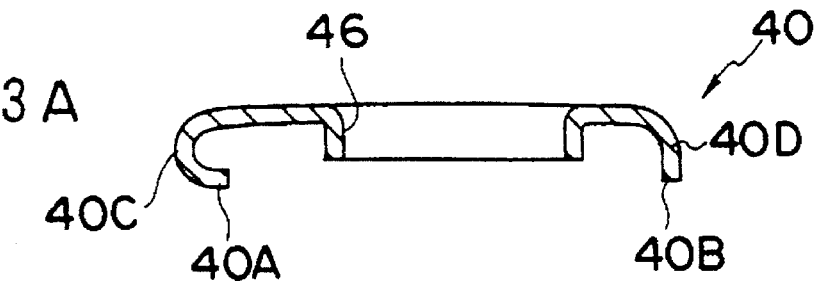
F I G. 3B
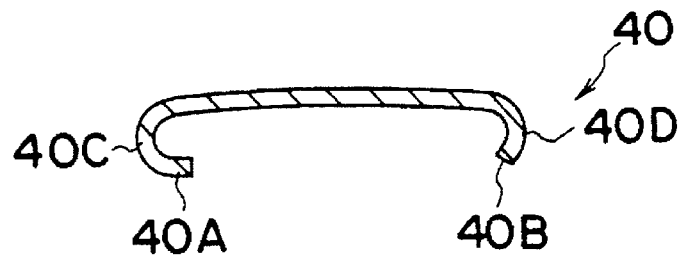
F I G. 3C
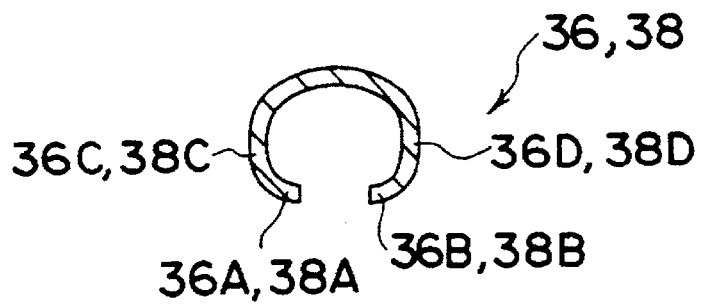
F I G. 3D
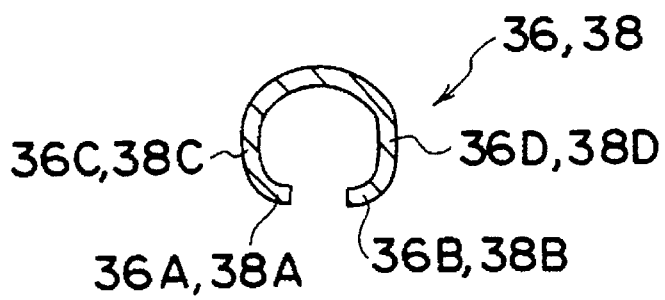
F I G. 3E
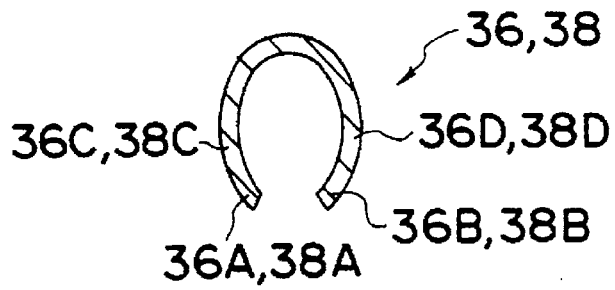

FIG. 4
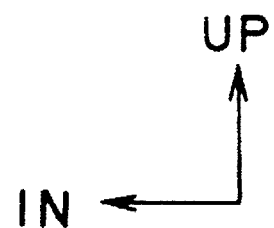
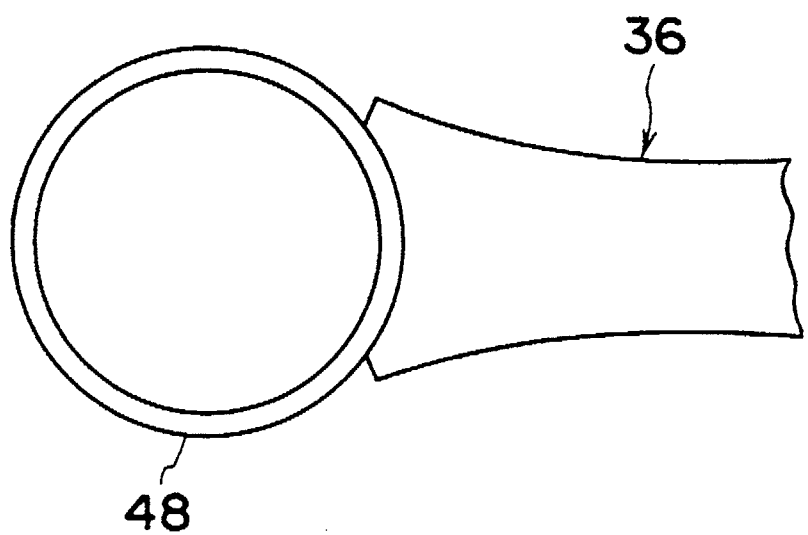

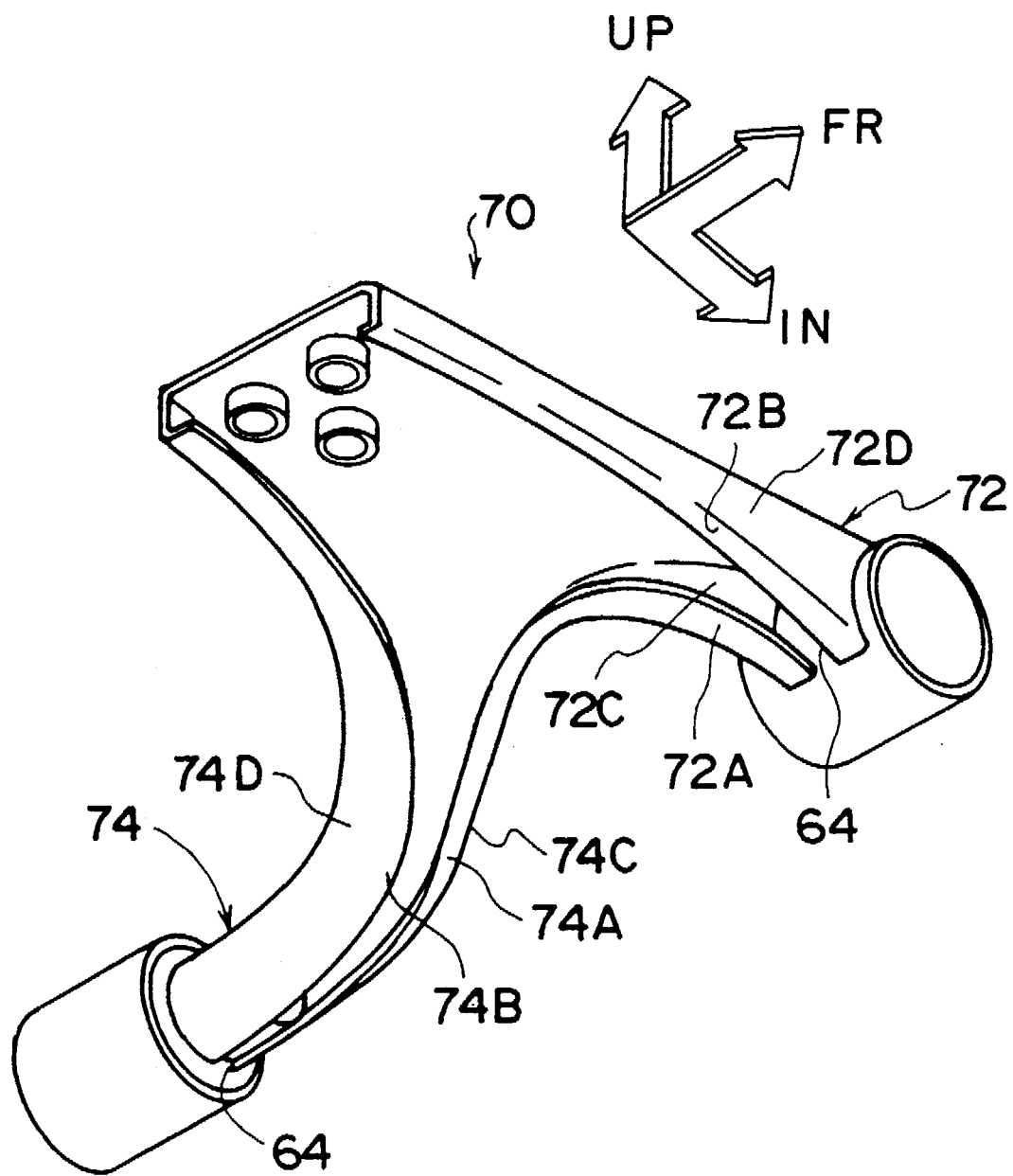

MAY BE SPOT WELDED

F I G. 17
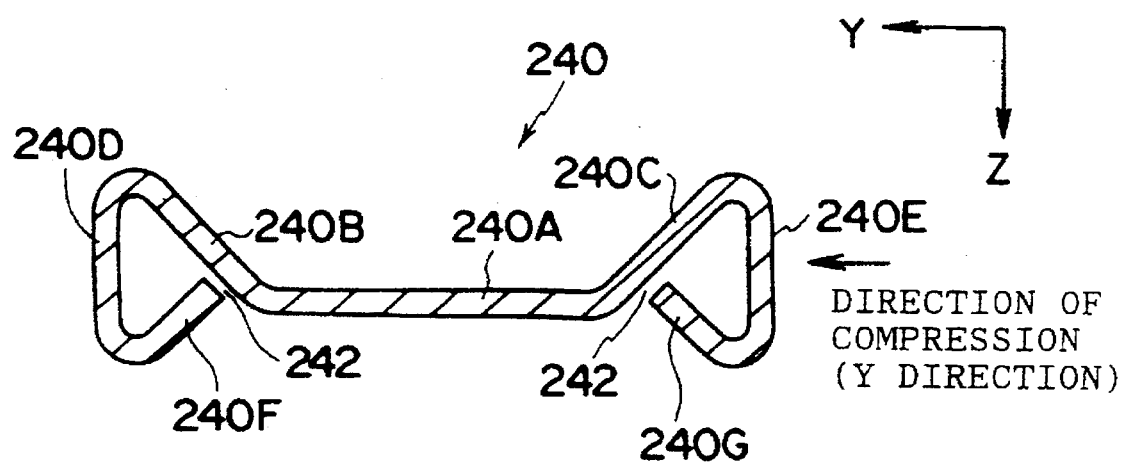

5,662,348

SUSPENSION ARM

BACKGROUND OF THE INVENTION

1. Field of the Invention

The present invention relates to a suspension arm formed by press working a plate-shaped member.

2. Description of the Related Art

There are various types of suspensions such as a double wishbone type, a strut type, a multi-link type, a trailing arm type, and the like. Accordingly, there are various types of suspension arms forming the suspensions. There are various configurations of suspension arms such as an A-type arm, an L-type arm, an I-type arm and the like, as well as various structures for suspension arms such as a structure in which a pipe-shaped member or a steel plate is press worked, an aluminum forged structure, and the like.

As described above, there are various types of suspension arms, and among these, a suspension arm which is fabricated by press working a single steel plate will be described hereinafter. The structure disclosed in Japanese Utility Model Application Laid-Open No. 61-57009 is an example of such a suspension arm.

To describe this structure briefly, as illustrated in FIG. 22, a suspension arm 100 includes a main portion 100A, which has a substantially U-shaped cross-section open toward the bottom of the vehicle, and flange portions 100B, which are provided at the lower end portions of the main portion 100A and which are bent in the longitudinal direction of the vehicle in directions of moving away from one another. On the whole, the suspension arm 100 has a substantially heart-shaped open cross-sectional configuration. The suspension arm 100 is fabricated by press working a single steel plate, and, as can be seen when viewed from above, is a substantially V-shaped or A-type arm.

The suspension disclosed in the aforementioned publication is a strut-type suspension. More specifically, the vehicle inner side distal ends of the bifurcations of the suspension arm 100 are connected to a vehicle body member 104 via bushes 102 so as to be freely swingable. Further, the vehicle outer side end portion of the suspension arm 100 is connected to the lower end portion of an axle carrier 106 which supports a wheel. The lower end portion of a shock absorber 110, around which a coil spring 108 is disposed, is connected to the upper end portion of the axle carrier 106.

When the suspension arm 100 having the above-described configuration is used, the following drawbacks arise. When the vehicle is traveling, load in the longitudinal direction of the vehicle is input to the suspension arm 100 from the wheel. This load in the longitudinal direction of the vehicle works as a force which attempts to bend the suspension arm 100. In particular, a relatively large bending moment is applied to the flange portion 100B in the vicinity of the portion encircled and denoted by letter A in the figure. As a result, the maximum tensile stress due to bending is generated in a vicinity of portion A. Accordingly, in order to ensure the rigidity of the vicinity of portion A of the flange portion 100B, the rigidity of the suspension arm 100 must be increased. More specifically, countermeasures such as increasing the overall thickness of the plate must be devised. As a result, a drawback arises in that the weight of the suspension arm 100 increases.

SUMMARY OF THE INVENTION

In view of the aforementioned, an object of the present invention is to provide a suspension arm which is fabricated by press forming and which can ensure sufficient rigidity without leading to drawbacks such as an increase in weight or the like.

A first aspect of the present invention is a suspension arm formed by press working a plate-shaped member, wherein in a case in which, while a vehicle is traveling, a load is inputted to the suspension arm in a direction intersecting a direction in which the suspension arm swings, at least a region at which a maximum stress is generated is a non-end portion of the plate-shaped member.

In accordance with the above-described first aspect, in a case in which, while the vehicle is traveling, a load in a direction intersecting a swinging direction of the arm is inputted to the suspension arm, at least the region at which the maximum stress is generated is a non-end portion of the plate-shaped member. Therefore, the suspension arm of the first aspect is more advantageous in terms of rigidity than a case in which the region at which the maximum stress is generated is an end region (a flange portion) such as in conventional structures. More specifically, the stress, which is caused by bending which arises when load in the direction intersecting the swinging direction of the arm is inputted to the suspension arm, can be decreased in accordance with the present invention. As a result, not only is there no need to make the plate-shaped member thicker in order to reinforce the region at which the maximum stress is generated, but also, sufficient rigidity can be ensured even if the plate-shaped member is thin.

In a second aspect of the present invention, in the first aspect, the suspension arm has an arm portion which is disposed so as to be swingable around a line extending along a substantially longitudinal direction of the vehicle and whose longitudinal direction is a direction intersecting the substantially longitudinal direction of the vehicle, and an edge portion of the arm portion in the substantially longitudinal direction of the vehicle is a non-end portion of the plate-shaped member.

In the above-described second aspect, the suspension arm includes an arm portion which is disposed so as to be swingable around a line extending along the substantially longitudinal direction of the vehicle and whose longitudinal direction is a direction intersecting the substantially longitudinal direction of the vehicle. This type of suspension arm has the same operation as that of the first aspect because, in accordance with the present invention, an end portion of the arm portion in the substantially longitudinal direction of the vehicle is the non-end portion of the plate-shaped member of the first aspect. Namely, the suspension arm relating to the second aspect also is advantageous in terms of rigidity. There is no need for reinforcement, and sufficient rigidity can be ensured even if the plate-shaped member is thin.

In a third aspect of the present invention, in either the first or the second aspect, the end portion of the plate-shaped member is bent toward another region of the suspension arm.

In accordance with the above-described third aspect, the end portion of the plate-shaped member is bent toward another region of the suspension arm in either the first or the second aspect. Therefore, the region of the suspension arm at which the maximum stress is generated is not the end portion of the plate-shaped member. Moreover, by bending the end portion of the plate-shaped member toward another region of the suspension arm, the section modulus of the suspension arm itself can be increased, and the structure is advantageous in terms of rigidity.

In a fourth aspect of the present invention, in the third aspect, the end portion of the plate-shaped member is adjacent to the other region of the suspension arm.

In accordance with the fourth aspect, the end portion of the plate-shaped member is adjacent to the other region of the suspension arm in the third aspect. Therefore, when a large load is applied at least to the suspension arm, the end portion is made to contact the other region of the suspension arm, and deformation of the suspension arm can be controlled. As a result, this structure is even more advantageous in terms of rigidity.

In the above aspects, the cross-sectional configuration of the arm in the region at which a maximum stress is generated may be a C-shaped configuration, a horseshoe-shaped configuration, a generally rectangular configuration, or the like.

BRIEF DESCRIPTION OF THE DRAWINGS

FIG. 3A is a cross-sectional view taken along line 3A—3A of FIG. 2.

FIG. 3B is a cross-sectional view taken along line 3B—3B of FIG. 2.

FIG. 3C is a cross-sectional view taken along line 3C—3C of FIG. 2.

FIG. 3D is a cross-sectional view taken along line 3D—3D of FIG. 2.

FIG. 3E is a cross-sectional view taken along line 3E—3E of FIG. 2.

FIG. 4 is a side view of a distal end portion of the upper arm illustrated in FIG. 1, as viewed in the direction of arrow Q in FIG. 2.

FIG. 7 is a perspective view corresponding to FIG. 1 and illustrating an L-type arm relating to another embodiment.

FIG. 17 is a cross-sectional view, corresponding to FIG. 12, of a lower arm relating to a fourth embodiment.

DESCRIPTION OF THE PREFERRED EMBODIMENTS

[First Embodiment]

A first embodiment of the present invention will be described hereinafter on the basis of FIGS. 1 through 6. The first embodiment corresponds to the embodiment of the above-described first and second aspects. In the figures, the arrow FR points toward the front of the vehicle, the arrow UP points toward the top of the vehicle, and the arrow IN points toward the interior of the vehicle.

Figure 6:
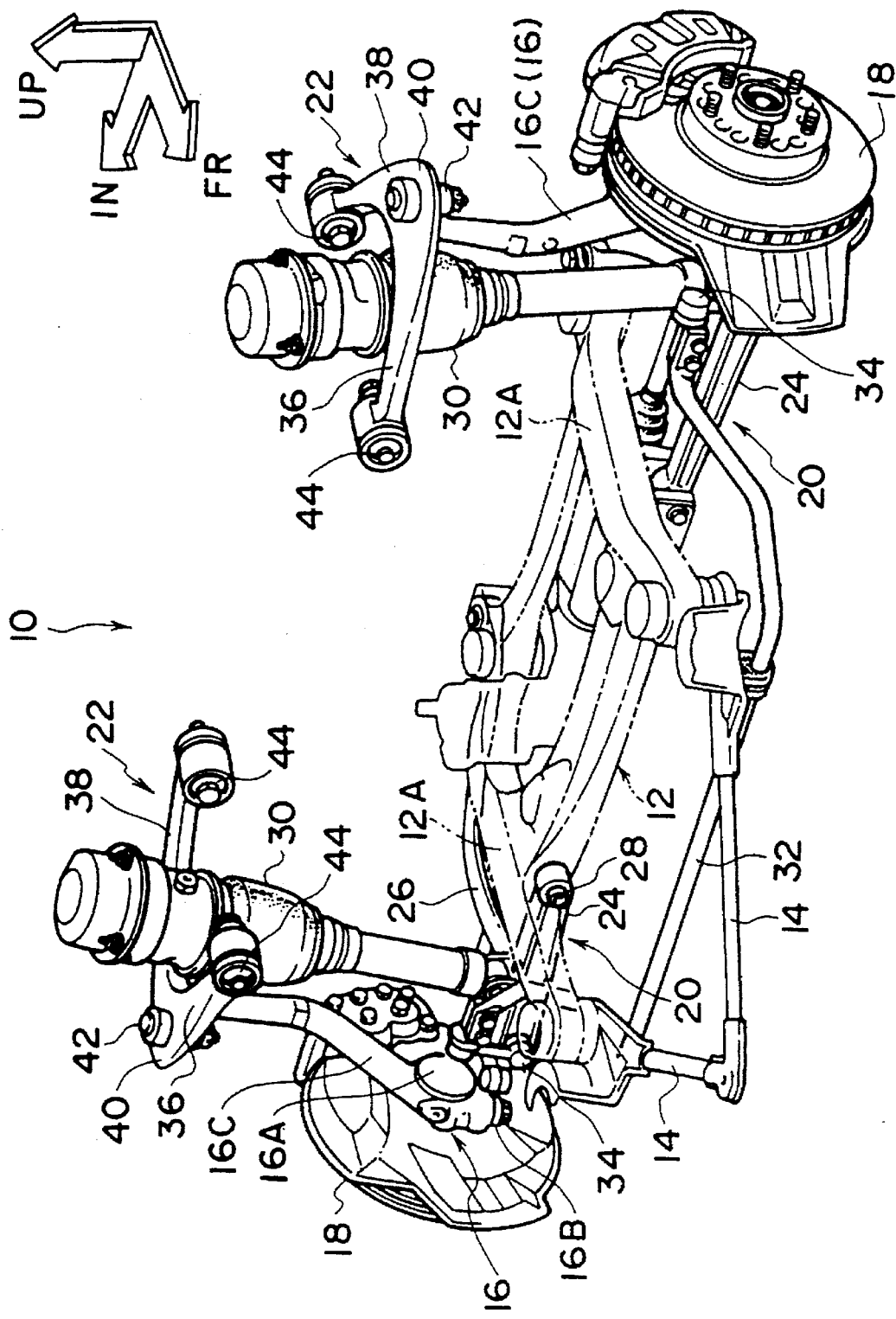
FIG. 6 an overall perspective view illustrating a front suspension equipped with the upper arm illustrated in FIG. 1.

FIG. 6 is a perspective view of a double wishbone independent suspension type front suspension 10. First, the overall structure of the front suspension 10 will be summarized by using this figure.

A subframe 12 is disposed under the front portion of the vehicle. The subframe 12 is formed in a substantial "#" or "tic-tac-toe board" shape as viewed from above. Front frame rods 14 are mounted between the front end portions of side portions 12A of the subframe 12 so as to intersect each other. The front frame rods 14 have a bracing function to increase the rigidity of the subframe 12. Unillustrated rear frame rods are suspended between the rear end portions of the side portions 12A of the subframe 12.

Axle carriers 16 are disposed at the outer sides of the side portions 12A of the subframe 12. The axle carrier 16 is formed by a boss portion 16A, a lower end portion 16B which is disposed directly under the boss portions 16A, and an extending portion 16C which extends from the boss portion 16A toward the top of the vehicle. A disc rotor 18 for braking, which rotates together with the wheel, is supported at the boss portion 16A of the axle carrier 16 so as to be freely rotatable. An L-type lower arm 20 is disposed at the lower end portion of the axle carrier 16. An A-type upper arm 22 is disposed at the upper end portion of the axle carrier 16 substantially parallel to the lower arm 20.

The lower arm 20 is formed by a first arm 24 and a second arm 26. The first arm 24 is disposed along a substantially transverse direction of the vehicle, and the second arm 26 is mounted by bolts to the first arm 24 so as to be disposed at an angle with respect to the first arm 24. The end portion of the lower arm 20 at the vehicle exterior side is joined to the lower end portion of the axle carrier 16 via an unillustrated ball joint. The respective distal end portions of the first arm 24 and the second arm 26, which are the end portions of the lower arm 20 at the vehicle interior side, are joined to the side portion 12A of the subframe 12 via lower arm bushes 28. A shock absorber 30 is supported at the upper end portion of the first arm 24 of the lower arm 20. A stabilizer bar 32, which is substantially U-shaped when viewed from above, is joined via stabilizer links 34 to the respective first arms 24.

The upper arm 22 is, as will be described later, an integrally formed part which is formed by a first arm portion 36, a second arm portion 38, and a connecting portion 40. The first arm portion 36 extends forward at an angle toward the vehicle interior, with respect to a substantially longitudinal direction of the vehicle. The second arm portion 38 extends rearward at an angle toward the vehicle interior, with respect to the substantially longitudinal direction of the vehicle. The connecting portion 40 connects the first arm portion 36 and the second arm portion 38 at the vehicle outer side, and is connected to the upper end portion of the extending portion 16C of the axle carrier 16 via a ball joint 42. Further, the end portion of the first arm portion 36 at the vehicle interior side and the end portion of the second arm portion 38 at the vehicle interior side are each joined to the vehicle body via an upper arm bush 44. In this way, the upper arm 22 is swingable around an axis P (see FIG. 2) of both of the upper arm bushes 44 (i.e., the upper arm 22 is swingable around a line extending along the substantially longitudinal direction of the vehicle).

Figure 1:
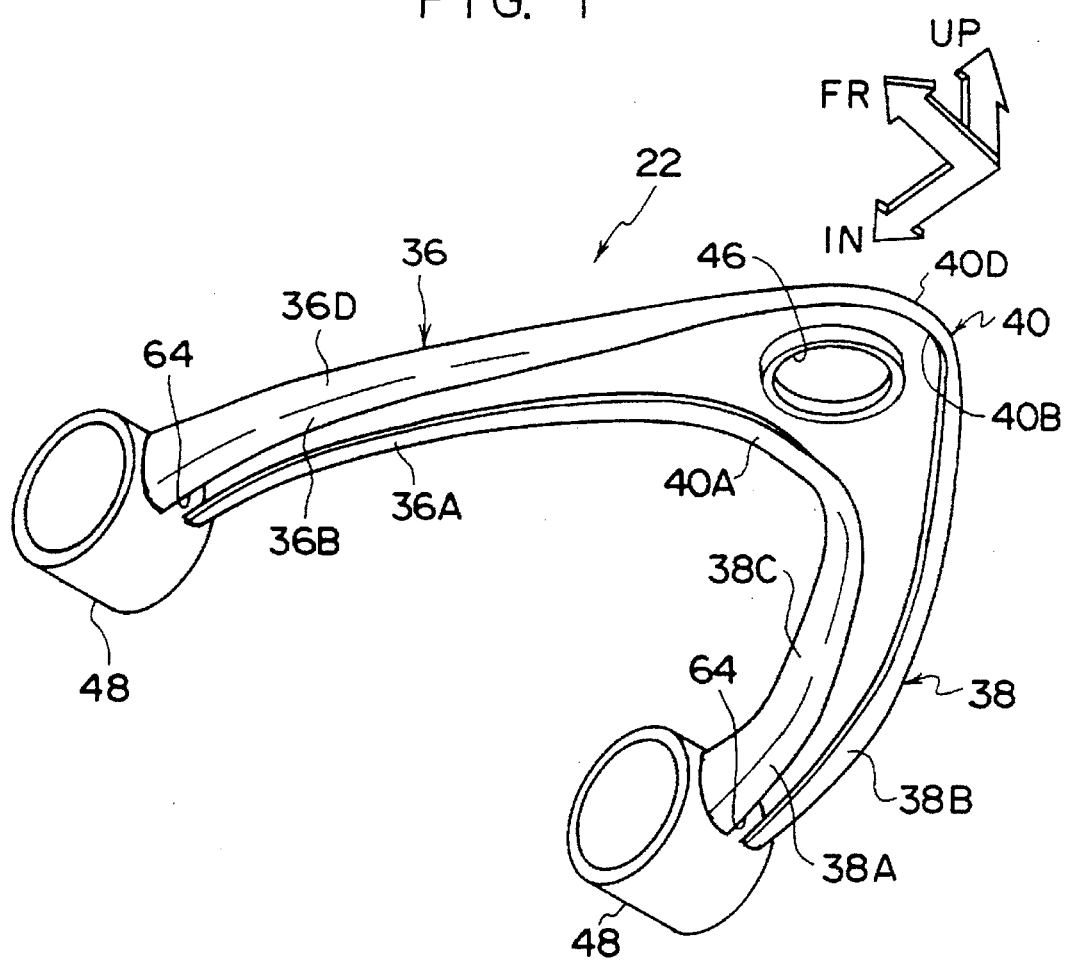
FIG. 1 is a perspective view as seen from a bottom side of an upper arm relating to a first embodiment.
Figure 2:
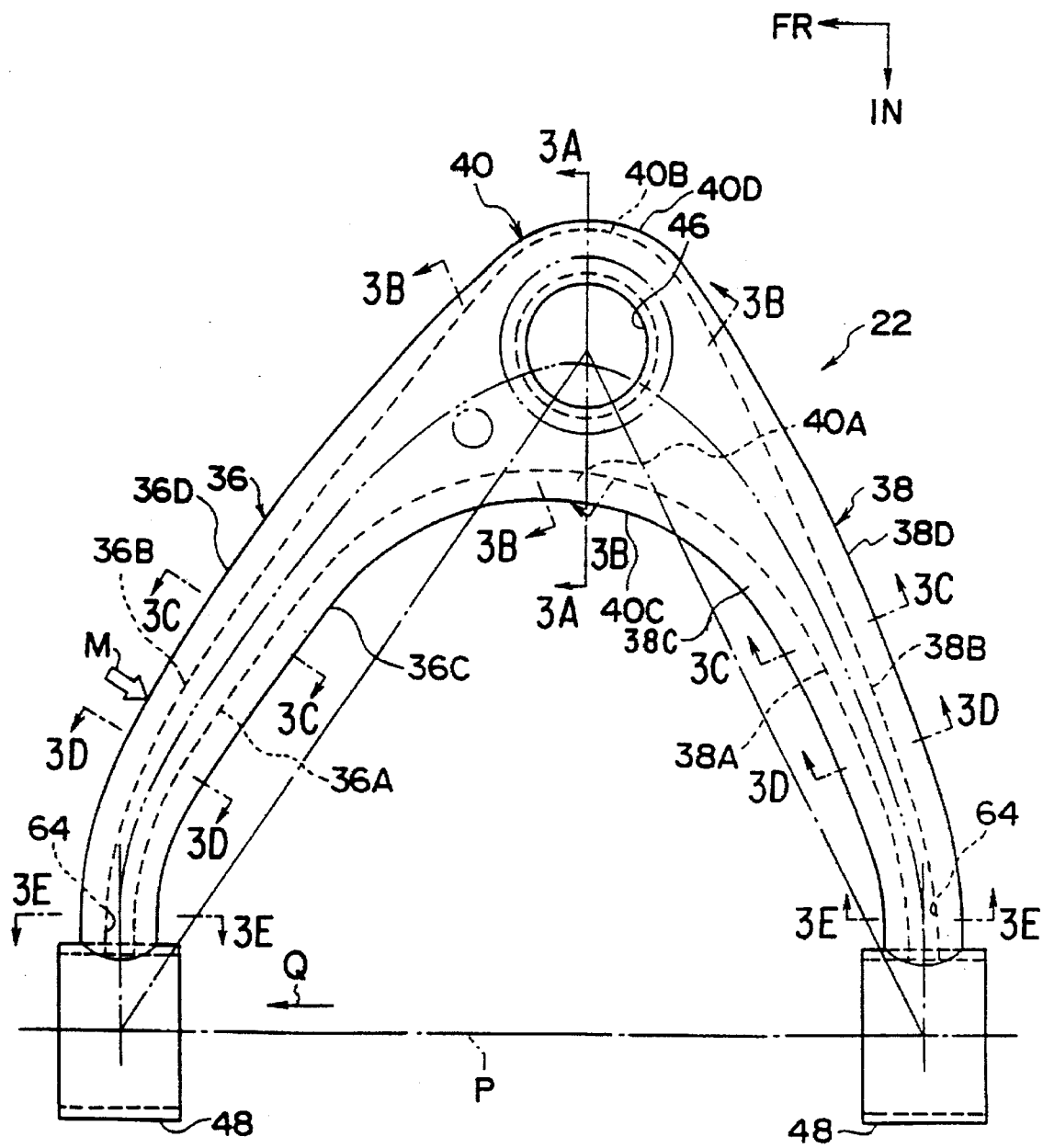
FIG. 2 is a plan view of the upper arm illustrated in FIG. 1.

The structure of the upper arm 22 will be described in detail on the basis of FIGS. 1 through 5. FIG. 1 is a perspective view of the upper arm 22 as seen from the bottom side thereof. FIG. 2 is a plan view of the upper arm 22. FIGS. 3A through 3E are cross-sectional views of respective portions of the upper arm 22. As can be seen from these drawings, in the present embodiment, the upper arm 22, which is formed from the first arm portion 36, the second arm portion 38, and the connecting portion 40, is manufactured by press forming a single plate.

More specifically, as illustrated in FIGS. 3A and 3B, the connecting portion 40 of the upper arm 22 has a flat, substantially C-shaped cross-section. A cylindrical hole 46 for the mounting of the ball joint 42 is formed at the substantially central portion of the connecting portion 40. Further, the inner side end portion 40A and the outer side end portion 40B of the connecting portion 40 are bent in directions of approaching each other. Accordingly, a side portion 40C at the innermost side of the connecting portion 40 and a side portion 40D at the outermost side are non-end portions. Note that the outer side end portion 40B at the region of line 3A—3A does not bend inwardly in cross-section (see FIG. 3A). However, as will be explained later, this does not present any problems as this region is not a region at which maximum tensile stress is generated.

As illustrated in FIGS. 3C through 3E, at their intermediate portions including the 3C—3C line regions and the 3D—3D line regions the first arm portion 36 and the second arm portion 38 have substantially C-shaped cross-sections which are almost circles, whereas at the distal end portions including the 3E—3E line regions, the first arm portion 36 and the second arm portion 38 have substantially C-shaped cross-sections which are almost horseshoe-shaped. Further, an inner side end portion 38A and an outer side end portion 38B of the first arm portion 38 are bent in directions of approaching each other, as are an inner side end portion 38A and an outer side end portion 38B of the second arm portion 38. Accordingly, an innermost side portion 38C and an outermost side portion 38D of the first arm portion 38 and an innermost side portion 38C and an outermost side portion 38D of the second arm portion 38 are non-end portions.

As illustrated in FIGS. 1, 2 and 4, cylindrical bush mounting sleeves 48, into which the upper arm bushes 44 are press-fit, are fixed by welding to the respective distal end portions of the first arm portion 36 and the second arm portion 38.

As can be understood from the above description, the upper arm 22 of the present embodiment is a press-formed part having an open cross-sectional configuration in which the bottom side of the arm is open.

Next, operation of the present embodiment will be described by explaining processes for fabricating the upper arm 22 with reference to FIGS. 5A through 5D. Although the following explanation relates to the regions of the upper arm 22 at the 3C—3C lines and the 3D—3D lines in FIG. 2, the other regions are formed in the same way.

Figure 5A:
FIGS. 5A through 5D are process views illustrating processes for fabricating the upper arm illustrated in FIG. 1.
Figure 5B:
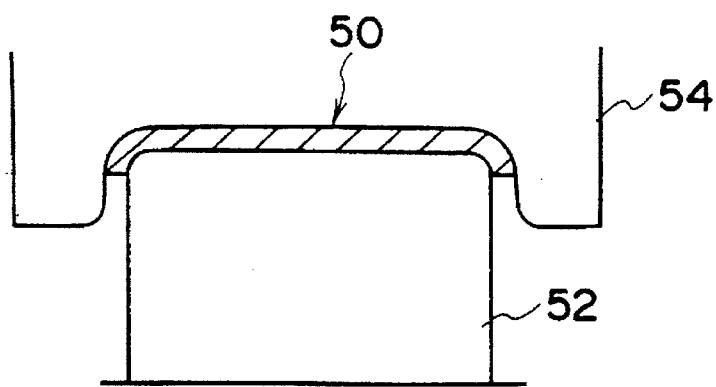
Figure 5C:
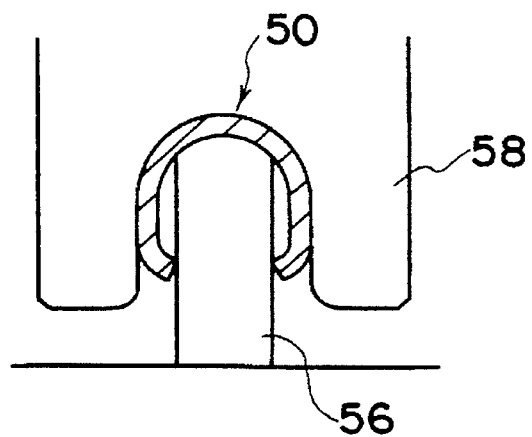
Figure 5D:
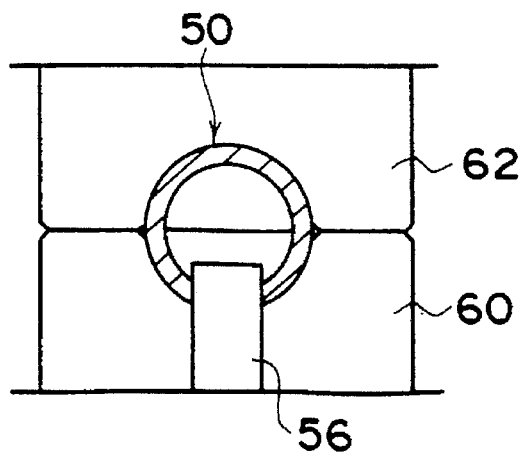

In the first process illustrated in FIG. 5A, the expanded configuration of the upper arm 22 is blanked out from a plate such as a steel plate or the like, so as to form a base material 50. Next, in the second process illustrated in FIG. 5B, the blanked out base material 50 is placed on the horizontal upper end surface of a lower bending tool 52. By pressing an upper bending tool 54 against the lower bending tool 52, bent flange portions are formed at the transverse direction end portions of the base material 50. These bent flange portions are the previously-described inner side end portion 38A and outer side end portion 38B of the first arm portion 38 (or the inner side end portion 38A and outer side end portion 38B of the second arm portion 38). In the third process illustrated in FIG. 5C, in place of the lower bending tool 52, a narrow lower insert die 58 is set at the transverse direction intermediate portion of the base material 50. In this state, an upper bending tool 58, which is narrower than the aforementioned upper bending tool 54, is pushed against the lower insert die 58. In this way, the base material 50 is formed with a substantially C-shaped cross section. Next, in the fourth process shown in FIG. 5D, the base material 50 is lowered a predetermined amount with the lower insert die 58 still disposed thereat, and in this state, a lower bending tool 60 and an upper bending tool 62, each having a substantially semicircular column shaped concave portion, are pressure-fit, so that the final substantially C-shaped open cross-section which is almost a circle is formed. The above-described working method is also known as curling-working.

The front suspension 10, which is equipped with the upper arm 22 manufactured as described above, is incorporated into a vehicle. When the vehicle is traveling, the upper arm 22 swings around the line P which is the axis of the upper arm bushes 44 (i.e., the upper arm 22 swings around a line extending along the longitudinal direction of the vehicle). At this time, load in the longitudinal direction of the vehicle is input from the wheel to the first arm portion 38 and the second arm portion 38 of the upper arm 22. This load in the longitudinal direction of the vehicle works as a force which attempts to bend the first arm portion 38 and the second arm portion 38. Experimentation has revealed that a relatively large bending moment is applied in particular to the region of the first arm portion 36 at arrow M and the vicinity thereof (see FIG. 2). The reason why a relatively large bending moment is applied to the region at arrow M and the vicinity thereof is that, because the amount of displacement of the first arm portion 38 in the longitudinal direction of the vehicle from a central line (corresponding to line 3A—3A) of the hole 46, which is the axle carrier 16 side supporting point of the upper arm 22, is greater than the amount of displacement of the second arm portion 38, the vicinity of the region at arrow M and the vicinity thereof are far from the load line, and the moment which works on the region at arrow M and the vicinity thereof increases.

Therefore, the maximum tensile stress is generated at the region at arrow M and the vicinity thereof. However, in the present embodiment, the region at arrow M and the vicinity thereof are the outermost side portion 36D of the upper arm 22 (the first arm portion 38). More specifically, because the outer side end portion 36B is bent toward the inner side of the cross section, the region at arrow M and the vicinity thereof are a non-end portion, and therefore, the rigidity is greater than in the conventional art. Accordingly, even if a longitudinal direction load of the same magnitude is applied to the upper arm 22, the maximum tensile stress generated in the region at arrow M and the vicinity thereof is small. Experimentation has revealed that the maximum tensile stress in the present embodiment becomes half or less than half of the maximum tensile stress of the conventional art.

In the present embodiment, not only is the upper arm 22 having an open cross-sectional configuration manufactured from a single plate, but also, sufficient rigidity can be ensured because the inner side end portion 36A and the outer side end portion 36B of the first arm portion 36 are bent in directions of approaching each other, as are the inner side end portion 38A and the outer side end portion 38B of the second arm portion 38 (in particular, because the outer side end portion 36B of the first arm portion 36 is bent toward the inner side of the cross section).

Moreover, in accordance with the present embodiment, because sufficient rigidity can be ensured as described above, the upper arm 22 (i.e., the plate thickness of the upper arm 22) can be made thin. Accordingly, the upper arm 22 can be made lighter, and therefore, the entire vehicle can also be made lighter. Because the upper arm 22 can be made thin, the yield can be improved, which leads to a decrease in costs. Note that if the upper arm 22 is made as thick as conventional structures, an even more rigid upper arm can be obtained.

In accordance with the present embodiment, the upper arm 22 is formed to have an open cross-sectional configuration in which the bottom side thereof is open. A gap 64 (see FIG. 1) is formed continuously even at the portions of the upper arm 22 which are connected to the bush mounting sleeves 48 (the respective distal end portions of the first arm portion 36 and the second arm portion 38). Therefore, even if rain water or the like enters into the upper arm 22, the water can be reliably drained from the interior of the arm. Therefore, accumulation of rain water or the like at the portions connected to the bush mounting sleeves 48 can be prevented.

Although the present invention is applied to the upper arm 22 of the front suspension 10 in the present embodiment, the present invention is not limited to the same. The above-described first aspect may be applied to suspension arms of any of various types of suspensions. For example, FIG. 7 illustrates an example in which the present invention is applied to an L-type arm 70. To briefly summarize this structure, the L-type arm 70 has a first arm portion 72, which is disposed along the substantially transverse direction of the vehicle, and a second arm portion 74, which is bent in the substantially longitudinal direction of the vehicle. The L-type arm 70 has an open cross-sectional configuration whose bottom side is open. An inner side end portion 72A and an outer side end portion 72B of the first arm portion 72 are bent in directions of approaching each other, as are an inner side end portion 74A and an outer side end portion 74B of the second arm portion 74. Accordingly, an innermost side portion 72C and an outermost side portion 72D of the first arm portion 72 and an innermost side portion 74C and an outermost side portion 74D of the second arm portion 74 are all non-end portions. Therefore, the same effects as those of the previously described embodiment are achieved. Further, for example, load in the vehicle transverse direction when the vehicle is traveling is input to an unillustrated trailing arm which swings around a line extending along the transverse direction of the vehicle. Accordingly, the maximum tensile stress would be generated at a region of the trailing arm which is at the outer surface of the arm and which is in the vicinity of an intermediate portion between the vehicle body connecting point and the axle carrier connecting point. However, if the present embodiment is applied, the same effects as described previously can be achieved.

As described above, the first aspect can be applied to various types of suspension arms such as A-type, L-type, and I-type suspension arms which include a trailing arm. However, the second aspect may be applied to various types of suspension arms other than those including a trailing arm.

In the present embodiment, the upper arm 22 has an open cross-sectional configuration, and the inner side end portions 36A, 38A, 40A and the outer side end portions 36B, 38B, 40B at all of the regions, i.e., at the first arm portion 36, the second arm portion 38 and the connecting portion 40, are bent toward the inner side of the cross section. However, the present invention is not limited to the same, and it suffices that at least the end portion 36B at the region at which the maximum stress is generated is bent toward the inner side of the cross section (i.e., the region at arrow M and the vicinity thereof at the outermost side portion 36D of the first arm portion 36).

In the suspension arm of the first aspect, in a case in which, while the vehicle is traveling, a load is inputted to the suspension arm in a direction intersecting a direction in which the suspension arm swings, at least a region at which a maximum stress is generated is a non-end portion of the plate-shaped member. When this suspension arm includes the feature that the end portions of the plate-shaped member are bent in directions of approaching each other and a predetermined gap (corresponding to the gap 64) is provided between the opposing end portions, the effect that rain water or the like, which enters in while the vehicle is traveling, can be drained from the gap can be achieved even if suspension arm bushes (corresponding to the upper arm bushes 44), which are the points for connection to the vehicle body, are attached to the distal end portions of the suspension arm.

[Second Embodiment]

A second embodiment of the present invention will be described on the basis of FIGS. 8A through 11. Note that the second embodiment corresponds to an embodiment of the previously-described third aspect.

Figure 8B:
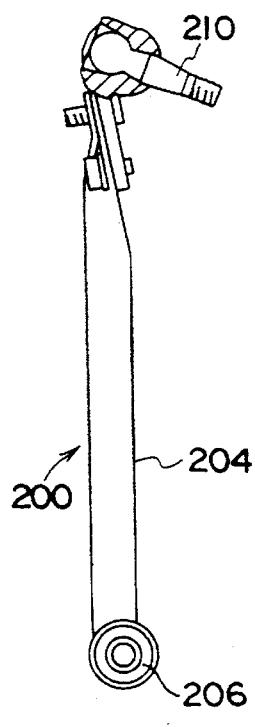
FIG. 8B is a side view of the lower arm relating to the second embodiment.
Figure 8A:
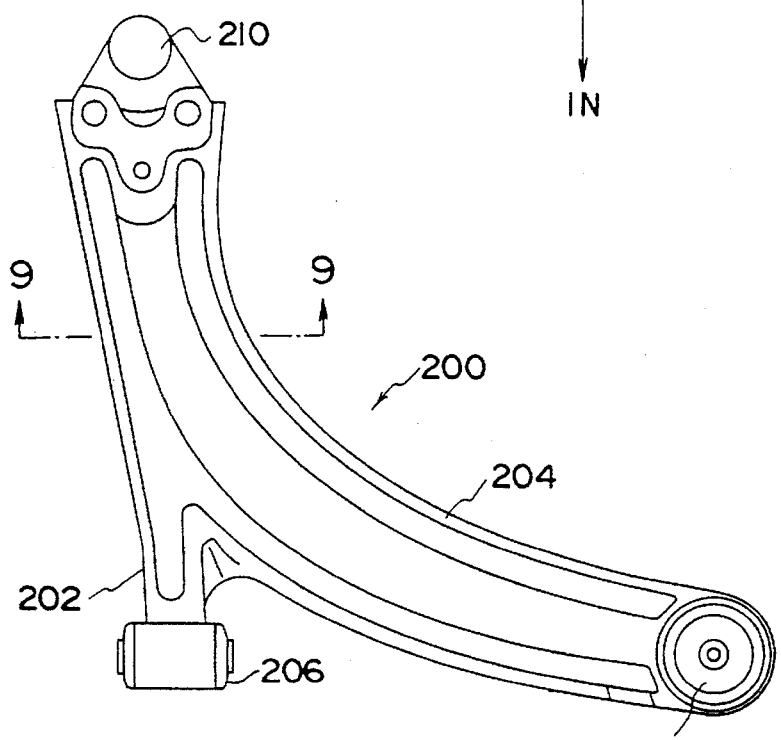
FIG. 8A is a plan view of a lower arm relating to a second embodiment.
Figure 8C:
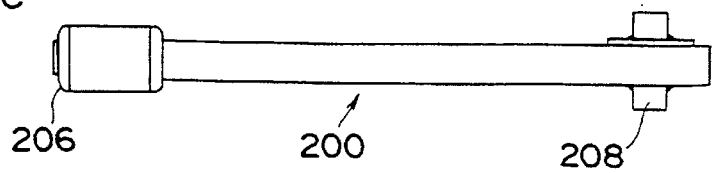
FIG. 8C is a side view of the lower arm relating to the second embodiment.

FIGS. 8A through 8C are three views of an L-shaped lower arm 200 relating to the present embodiment. As can be seen from the figures, the lower arm 200 includes a first arm portion 202, which is disposed along the substantially transverse direction of the vehicle, and a second arm portion 204, which is curved along the substantially longitudinal direction of the vehicle. The lower arm 200 has an open cross-sectional configuration in which the bottom side is open. The lower arm 200 is fabricated by press working a single plate. A bush 206, whose axial direction is the longitudinal direction of the vehicle, is mounted to the inner end portion of the first arm portion 202. A bush 208, whose axial direction is the vertical direction of the vehicle, is mounted to the inner end portion of the second arm portion 204. A ball joint 210 is mounted to the outer end portion of the second arm portion 204.

Figure 9:
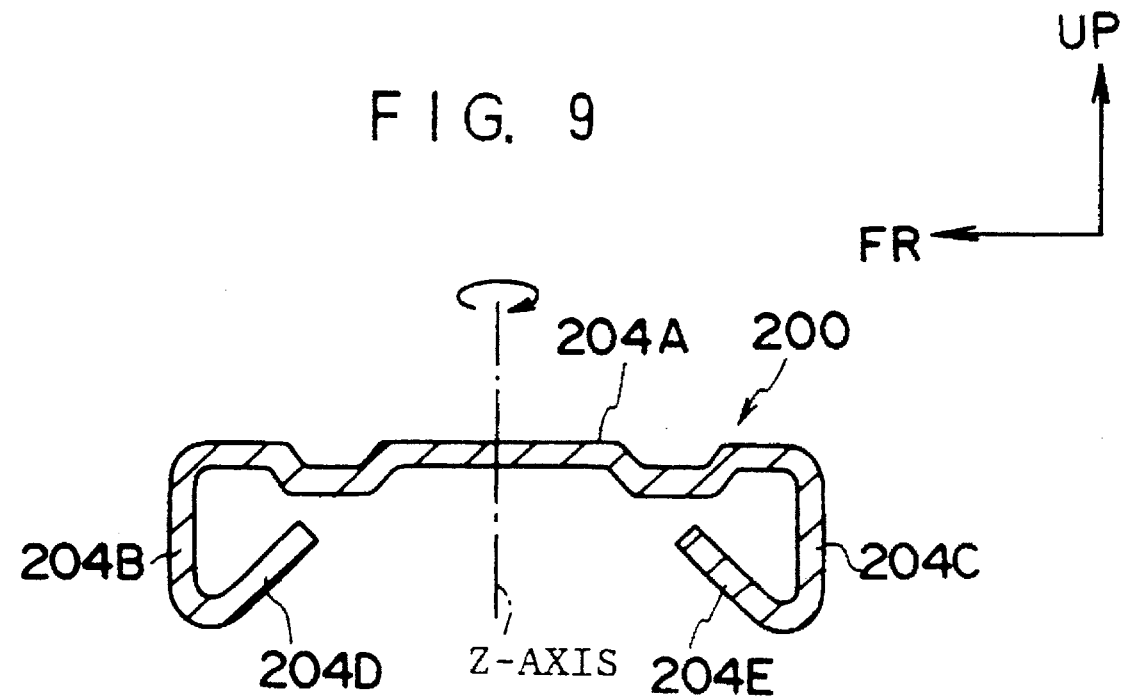
FIG. 9 is a cross-sectional view, taken along line 9—9, of the lower arm illustrated in FIG. 8A.
Figure 10:
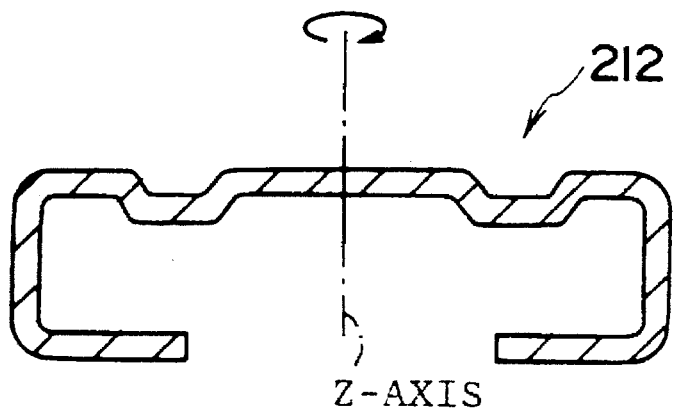
FIG. 10 is a cross-sectional view, corresponding to FIG. 9, of a lower arm relating to a comparative example.

FIG. 9 illustrates the general cross-sectional structure of the second arm portion 204 of the lower arm 200. As can be seen from this drawing, the second arm portion 204 is formed by a main portion 204A, side portions 204B, 204C, and end portions 204D, 204E. The main portion 204A is disposed substantially horizontally. The side portions 204B, 204C are bent downward from the transverse direction end portions of the main portion 204A and are parallel to one another. The end portions 204D, 204E are bent from the lower end portions of the side portions 204B, 204C. Accordingly, at the lower arm 200 as well, the region at which the maximum stress is generated (a vicinity of the position at line 9—9 in FIG. 8) is a non-end portion. Moreover, the feature of the present embodiment is that both of the end portions 204D, 204E are bent toward the inner side of the cross section at acute angles.

In accordance with the above-described structure, not only is the open cross-sectional configuration of the lower arm 200 made by press working a single plate, but also, sufficient rigidity can be ensured because the end portions 204D, 204E of the second arm portion 204 are bent toward the inner side of the cross section at acute angles and the region at which the maximum stress is generated is a non-end portion.

Although the feature that the region at which the maximum stress is generated is a non-end portion is the same as in the first embodiment, the present embodiment also includes the feature that the end portions 204D, 204E are bent at acute angles toward the inner side of the cross section. Therefore, the section modulus around the Z-axis which runs along the substantially vertical direction of the vehicle can be increased. More specifically, vicinities of the distal ends of the end portions 204D, 204E of the lower arm 200 of the present embodiment illustrated in FIG. 9 are further away from the Z-axis than the distal ends of a lower arm 212 illustrated in FIG. 10, which has the same thickness and cross-sectional area as the lower arm 200 and which has 90 degree end portions in cross section. Therefore, the section modulus around the Z-axis can be increased more in the present embodiment. As a result, although the lower arm 200 has an open cross-sectional configuration, the same rigidity as that of a lower arm having a closed cross-sectional configuration can be ensured. Accordingly, because the portion to which a relatively large bending moment is applied is a non-end portion, the lower arm 200 which is more advantageous in terms of rigidity can be obtained.

Figure 11A:
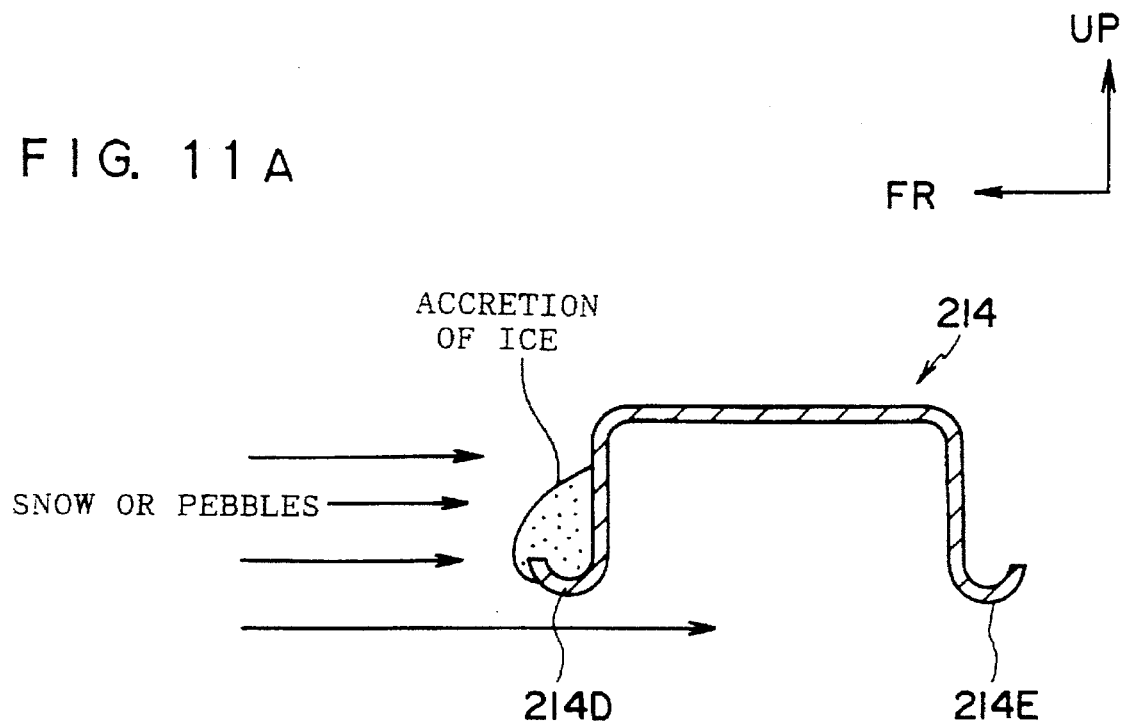
FIGS. 11A and 11B are explanatory views for explaining effects in a case in which the lower arm illustrated in FIG. 9 is used.
Figure 11B:
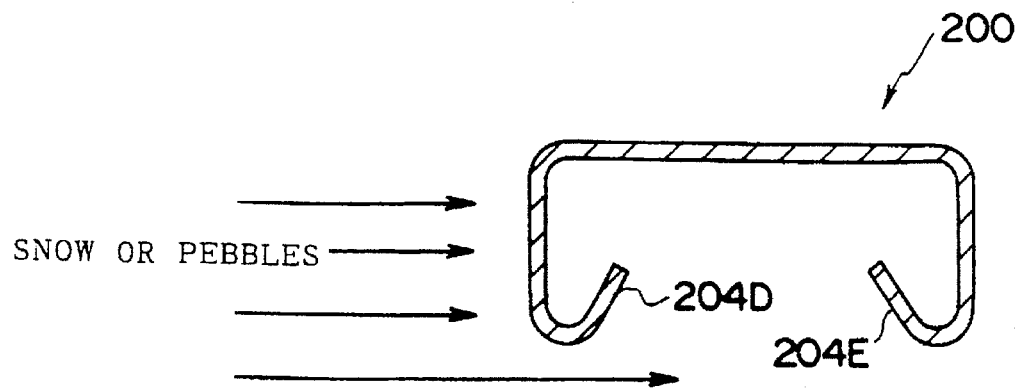

In accordance with the present embodiment, because the end portions 204D, 204E are bent toward the inner side of the cross-section, entry of snow into the lower arm 200 when the vehicle is traveling on snow-covered roads can be reduced, and therefore, icing of the lower arm 200 can also be reduced. More specifically, FIG. 11A illustrates an example of a lower arm 214 whose end portions 214D, 214E are bent toward the outer side of the cross-section. In this case, it is easy for ice to accrete on the end portion 214D which is at the front side of the vehicle. In contrast, as illustrated in FIG. 11B, with the lower arm 200 of the present embodiment whose end portions 204D, 204E are bent toward the inner side of the cross section, it is difficult for ice to accrete at the end portions 204D, 204E.

For suspension arms which are fabricated by press working a single plate, usually, paint does not adhere as well to the end portions as to the main portion, and it is easy for the layer of paint on the end portions to become thin. Moreover, it is easy for the paint to be marred by pebbles or stones which are flung from the front of the vehicle (see FIG. 11A), which presents drawbacks in terms of the rustproofing. However, in accordance with the present embodiment, because the end portions 204D, 204E are bent at acute angles toward the inner side of the cross section, it is difficult for pebbles flung from the front to hit the end portions 204D, 204E (see FIG. 11B), which is advantageous from the point of rustproofing.

[Third Embodiment]

A third embodiment will be described with reference to FIGS. 12 through 16. The third embodiment corresponds to an embodiment of the previously-described third aspect.

Figure 12:
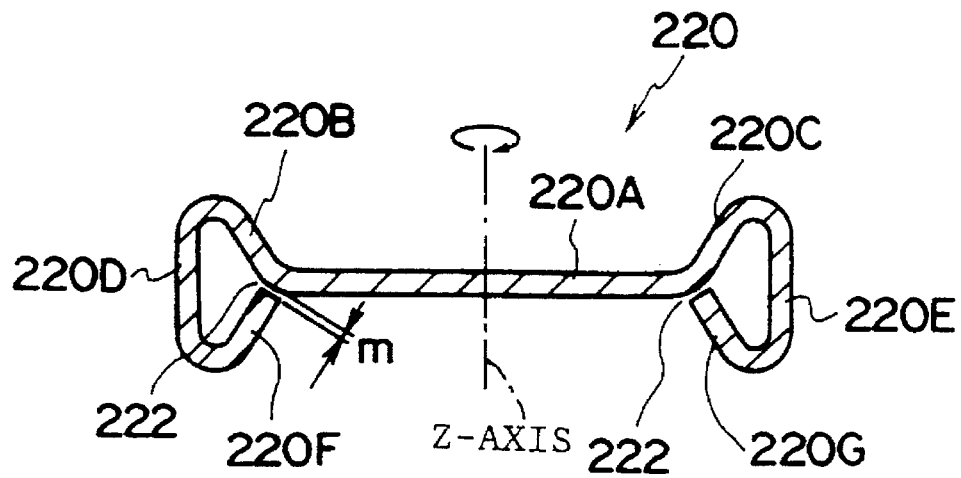
FIG. 12 is a cross-sectional view, corresponding to FIG. 9, of a lower arm relating to a third embodiment.

As illustrated in FIG. 12, a lower arm 220 of the present embodiment is formed by a main portion 220A, inclined portions 220B, 220C, side portions 220D, 220E, and end portions 220F, 220G. The main portion 220A is disposed substantially horizontally. The inclined portions 220B, 220C are bent so as to incline upwardly from the transverse direction end portions of the main portion 220A. The side portions 220D, 220E are bent downwardly from the end portions of the inclined portions 220B, 220C so as to extend parallel to one another. The end portions 220F, 220G are bent at acute angles toward the inner side of the cross section from the lower end portions of the side portions 220D, 220E. In this way, the lower arm 220 is formed such that the transverse direction end portions of the main portion 220A are folded into triangles. Gaps 222, each of which has a dimension m, are formed between the distal ends of the end portions 220F, 220G of the lower arm 220 and the proximal ends of the inclined portions 220B, 220C. It is desirable that the dimension m is a dimension which can be welded.

In accordance with the above-described structure, because the end portions 220F, 220G are bent at acute angles toward the inner side of the cross section, in the same way as in the above-described second embodiment, the section modulus around the Z-axis can be increased, and accretion of ice occurring when the vehicle travels on snow-covered roads and damage to the paint layer can be prevented.

Figure 13:
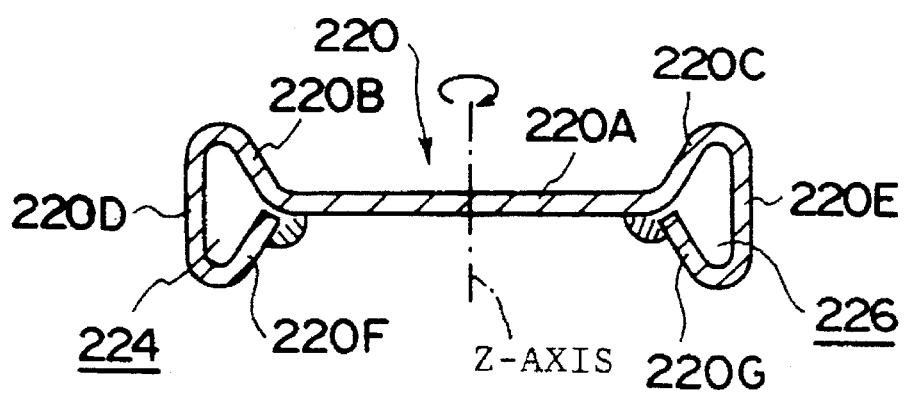
FIG. 13 is an explanatory view for explaining effects in a case in which the lower arm illustrated in FIG. 12 is used.
Figure 14:
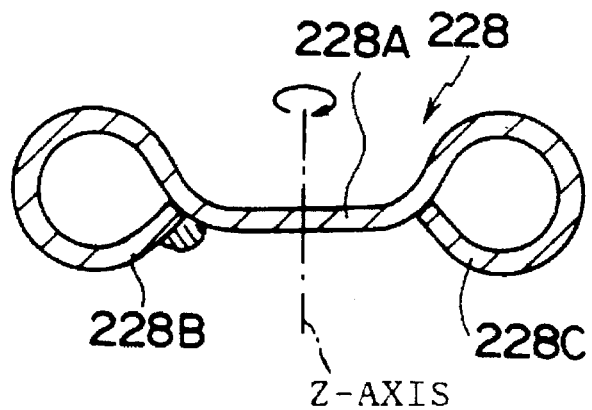
FIG. 14 is also an explanatory view for explaining effects in a case in which the lower arm illustrated in FIG. 12 is used.
Figure 15:
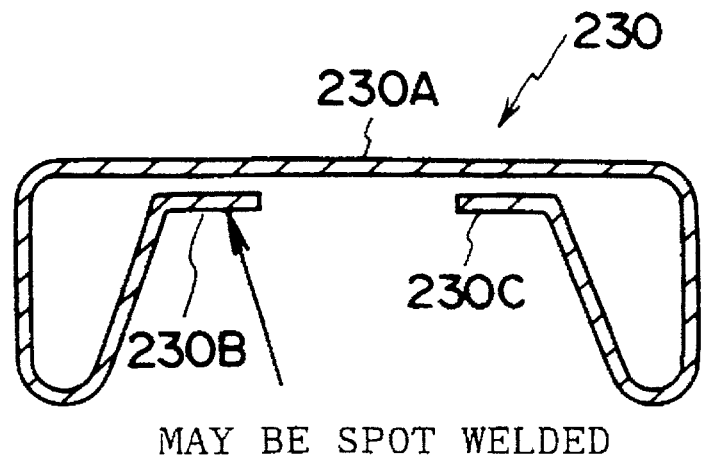
FIG. 15 is also an explanatory view for explaining effects in a case in which the lower arm illustrated in FIG. 12 is used.
Figure 16:
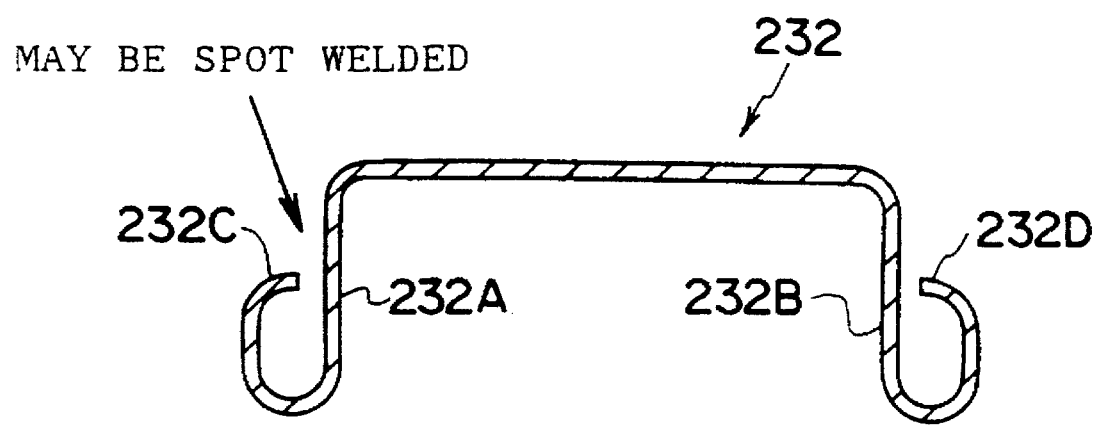
FIG. 16 is also an explanatory view for explaining effects in a case in which the lower arm illustrated in FIG. 12 is used.

Further, in accordance with the present embodiment, as illustrated in FIG. 13, by welding the end portions 220F, 220G to the proximal ends of the inclined portions 220B, 220C, closed cross-sectional portions 224, 226 are formed at the transverse direction end portions of the lower arm 220. Therefore, the torsional rigidity/strength and the bending rigidity/strength of the end portions of the cross section can be improved. As a result, the overall rigidity/strength of the lower arm 220 can be improved.

In a case in which vehicle weights of the same type of vehicle are different, generally, the suspension arm is designed to exhibit a strength which can handle the vehicle having the heavier weight. In this case, either there is excess design and an unnecessarily heavy arm for lighter vehicles, or there is a need to provide two types of arms of different thicknesses. However, in accordance with the present embodiment, the same type of suspension arm can be used for vehicles of various weights by appropriately deciding whether welding is to be effected and, if so, which portion(s) should be welded. More specifically, as in the case of the lower arm 220 illustrated in FIG. 13, both of the end portions 220F, 220G may be welded to the proximal ends of the inclined portions 220B, 220C. Further, as in the case of a lower arm 228 illustrated in FIG. 14, by welding only one end portion 228B to a main portion 228A and not welding another end portion 228C, the strength of the suspension arm can be changed. The same applies to a lower arm 230 shown in FIG. 15 and a lower arm 232 shown in FIG. 16. With regard to the lower arm 230, the distal end portions of end portions 230B, 230C are bent parallel along a main portion 230A. If either or both of these distal end portions are spot welded, the strength can be changed so as to correspond to the vehicle. Moreover, with regard to the lower arm 232, the strength can be changed in accordance with the vehicle by welding to side portions 232A, 232B either or both of the distal end portions of end portions 232C, 232D which are folded over at the lower arm 232.

[Fourth Embodiment]

A fourth embodiment will be described on the basis of FIGS. 17 through 21. The fourth embodiment corresponds to an embodiment of the previously-described fourth aspect.

As illustrated in FIG. 17, a lower arm 240 of the present embodiment is formed by a main portion 240A, inclined portions 240B, 240C, side portions 240D, 240E, and end portions 240F, 240G. The main portion 240A is disposed substantially horizontally. The inclined portions 240B, 240C are bent so as to be inclined upward from the transverse direction end portions of the main portion 240A. The side portions 240D, 240E are bent downward from the end portions of the inclined portions 240B, 240C so as to extend parallel to one another. The end portions 240F, 240G are bent at acute angles toward the inner side of the cross section from the lower end portions of the side portions 240D, 240E. In this way, the lower arm 240 is formed such that the transverse direction end portions of the main portion 240A are folded in triangles. The present embodiment is similar to the above-described third embodiment with respect to this point.

However, in the present embodiment, the position of the main portion 240A in the heightwise direction is set lower than that of the main portion 220A of the above-described lower arm 220. Accordingly, the lengths of the inclined portions 240B, 240C in the directions in which they extend are longer than the lengths of the inclined portions 220B, 220C of the lower arm 220. The distal end portions of the end portions 240F, 240G oppose these portions which have become longer. The end portions 240F, 240G are disposed adjacent to the inclined portions 240B, 240C so as to be orthogonal thereto. Gaps 242 are formed between the distal end portions of the end portions 240F, 240G and the inclined portions 240B, 240C.

Figure 18:
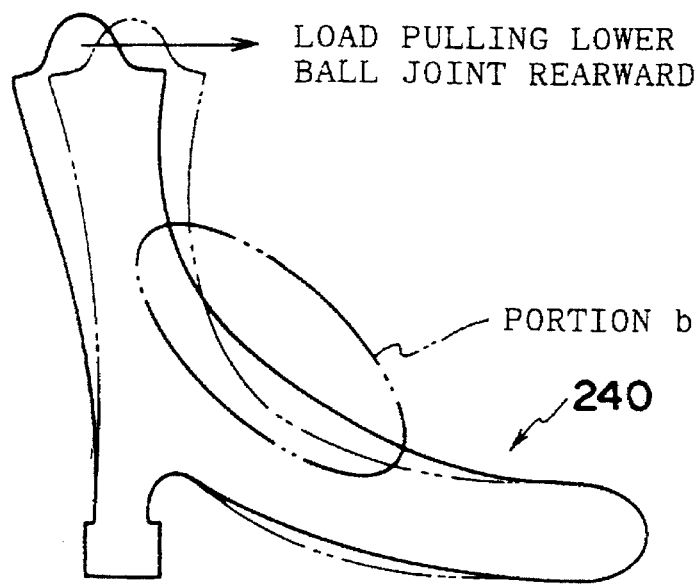
FIG. 18 is an explanatory view for explaining effects in a case in which the lower arm illustrated in FIG. 17 is used.
Figure 19:
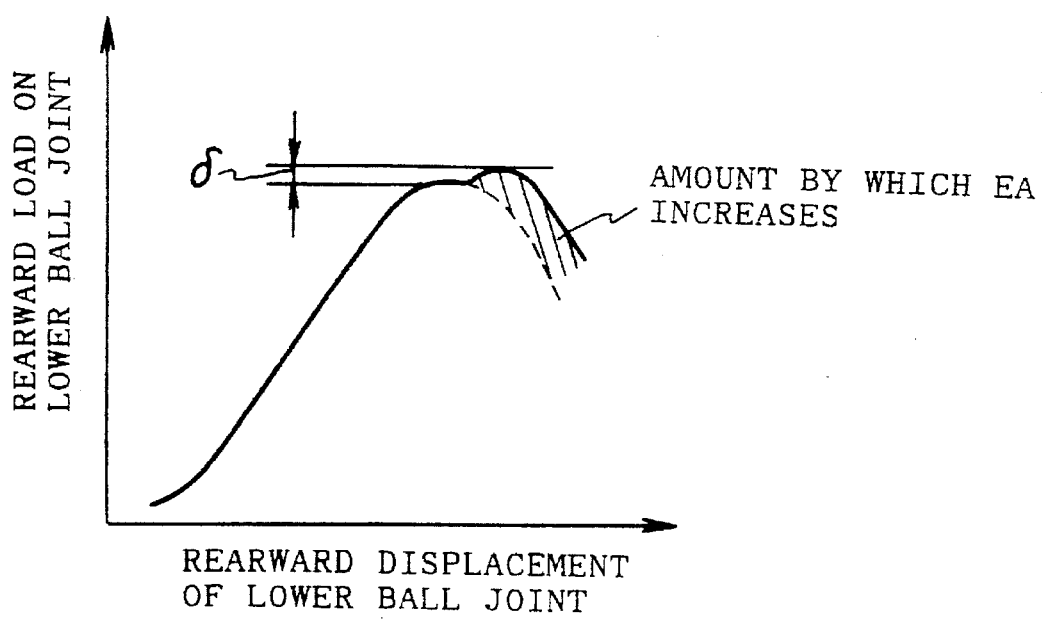
FIG. 19 is a graph for explaining effects in a case in which the lower arm illustrated in FIG. 17 is used.

Operation of the present embodiment will be described hereinafter. As illustrated in FIG. 18, the lower arm 240 deforms from the state illustrated by the solid line to the state illustrated by the two-dotted chain line with respect to loads pulling the lower ball joint toward the rear of the vehicle. In this case, a portion b of the lower arm 240 is compressively deformed. As a result, the distal end portion of the end portion 240G abuts the inclined portion 240C as the side portion 240E of the lower arm 240 deforms. As a result, the deforming load is transmitted to the main portion 240A which works as a bracing member in the direction of arrow Y illustrated in FIG. 17, so that the deformation of the end portion 240G is controlled. More specifically, the deformation proof stress with respect to loads pulling the lower ball Joint toward the rear of the vehicle improves. FIG. 19 is a graph with the rearward displacement of the lower ball Joint on the horizontal axis, and the rearward load on the lower ball joint on the vertical axis. In a case in which the distal end portion of the end portion 240G does not abut the inclined portion 240C, the characteristic is as illustrated by the broken line. When the distal end portion of the end portion 240G abuts the inclined portion 240C, the characteristic is as illustrated by the solid line. As can be seen from these lines, when the end portion 240G abuts the inclined portion 240C, the deformation proof stress increases by δ. Further, the amount of energy absorbed during impact (the EA amount) increases by the range illustrated by the hatching. Accordingly, in accordance with the present embodiment, not only does the section modulus around the Z-axis increase, but also, the deformation of the lower arm 240 is controlled by the end portion 240G abutting the inclined portion 240C as the lower arm 240 is deforming, so that the deformation proof stress improves, and the amount of energy absorbed during impact can be increased.

Figure 20:
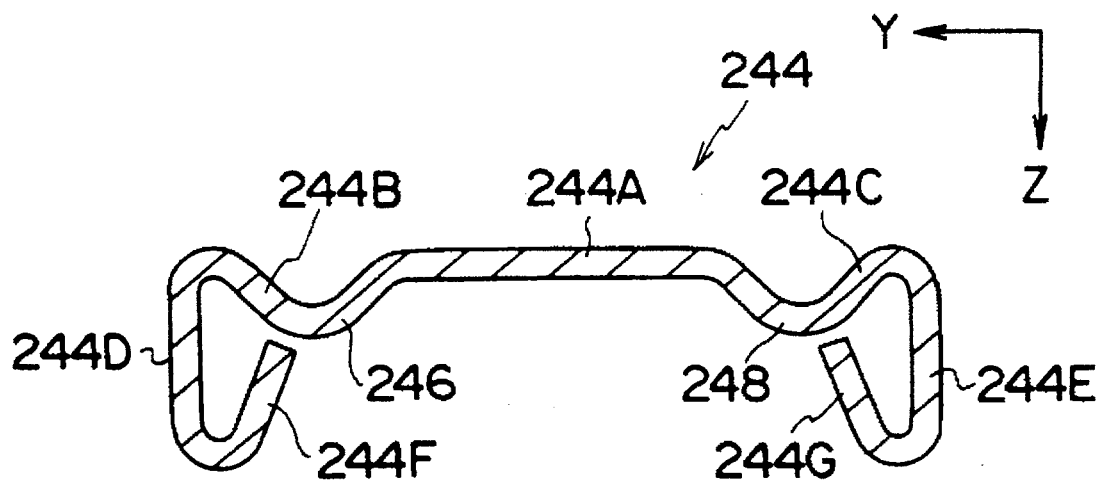
FIG. 20 is a cross-sectional view corresponding to FIG. 17 and illustrating an example of providing ribs at the lower arm illustrated in FIG. 17.

Although a lower arm 244 illustrated in FIG. 20 is similar to the above-described lower arm 240 with regard to the point that the lower arm 244 includes a main portion 244A, inclined portions 244B, 244C, side portions 244D, 244E, and end portions 244F, 244G, the following points are different. The main portion 244 is disposed at the top portion of the cross section, and ribs 246, 248 which are depressed downwardly are formed in vicinities of the end portions of the main portion 244A.

In accordance with the above-described structure, when the lower arm 244 is compressed in the Y direction, the ribs 248, 248 deform downwardly (in the Z direction). As a result, the end portion 244G abuts the rib 248. Accordingly, in accordance with this structure, the same effects as those of the previously-described embodiment are achieved. Namely, the same effects as those of the lower arm 240 illustrated in FIG. 17 can be achieved in the present embodiment with the main portion 244A disposed at the top portion of the cross section.

Figure 21:
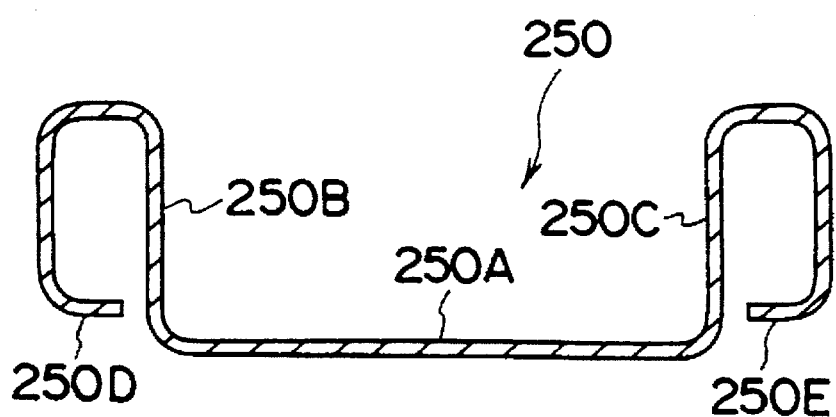
FIG. 21 is a cross-sectional view illustrating another structure which achieves the same effects as those achieved by the lower arm illustrated in FIG. 17.
Figure 22:
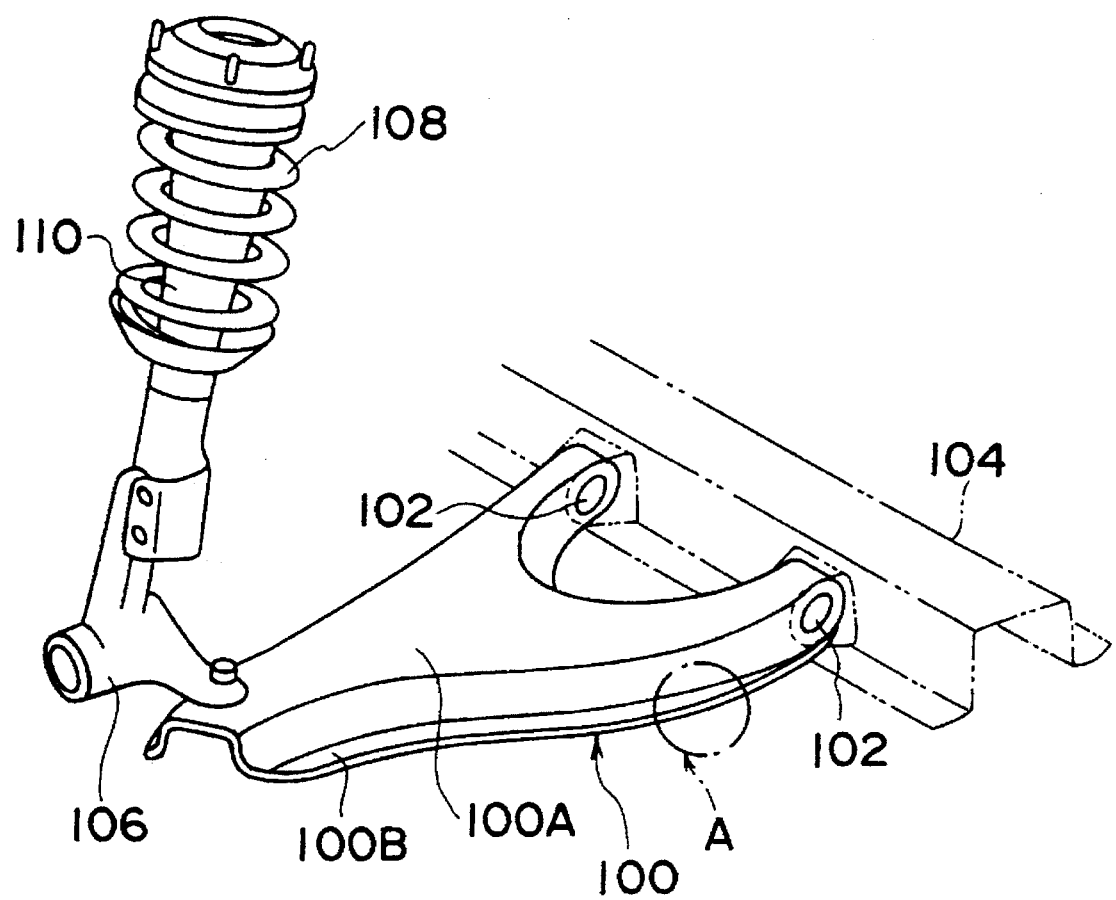
FIG. 22 is a perspective view illustrating a structure of a suspension arm relating to a conventional example.

In a lower arm 250 shown in FIG. 21, a main portion 250A is disposed at the bottom portion of the cross section. Distal end portions of end portions 250D, 250E are disposed adjacent to side portions 250B, 250C which rise from the transverse direction end portions of the main portion 250A. In accordance with the lower arm 250 as well, due to the end portion 250E abutting the side portion 250C during deformation, the deformation is controlled so that deformation proof stress is improved, and the amount of energy absorbed during impact is increased.

What is claimed is:

1. A suspension arm formed by press working a plate-shaped member, wherein in a case in which, while a vehicle is traveling, a load is inputted to said suspension arm in a direction intersecting a direction in which said suspension arm swings, at least a region at which a maximum stress is generated is a non-end portion of the plate-shaped member.

2. A suspension arm according to claim 1, wherein said suspension arm has an arm portion which is disposed so as to be swingable around a line extending along a substantially longitudinal direction of the vehicle and whose longitudinal direction is a direction intersecting the substantially longitudinal direction of the vehicle, and an edge portion of said arm portion in the substantially longitudinal direction of the vehicle is said non-end portion.

3. A suspension arm according to claim 1, wherein a cross-sectional configuration of the arm in said region at which a maximum stress is generated is one of a C-shaped configuration and a horseshoe-shaped configuration.

4. A suspension arm according to claim 2, wherein a cross-sectional configuration of the arm in said region at which a maximum stress is generated is one of a C-shaped configuration and a horseshoe-shaped configuration.

5. A suspension arm according to claim 1, wherein a cross-sectional configuration of the arm in said region at which a maximum stress is generated is a generally rectangular configuration.

6. A suspension arm according to claim 2, wherein a cross-sectional configuration of the arm in said region at which a maximum stress is generated is a generally rectangular configuration.

7. A suspension arm according to claim 1, wherein an end portion of the plate-shaped member is bent toward another region of said suspension arm.

8. A suspension arm according to claim 1, wherein an end portion of the plate-shaped member is bent toward another region of said suspension arm.

9. A suspension arm according to claim 4, wherein an end portion of the plate-shaped member is bent toward another region of said suspension arm.

10. A suspension arm according to claim 5, wherein an end portion of the plate-shaped member is bent toward another region of said suspension arm.

11. A suspension arm according to claim 7, wherein said end portion is adjacent to said another region of said suspension arm.

12. A suspension arm according to claim 8, wherein said end portion is adjacent to said another region of said suspension arm.

13. A suspension arm according to claim 10, wherein said end portion is adjacent to said another region of said suspension arm.

14. A suspension arm comprising:
   a suspension arm main body formed by press working a plate-shaped member; and
   a first region positioned at said suspension arm main body and including a region of said suspension arm main body at which a maximum stress is generated in a case in which, while a vehicle is traveling, a load in a direction intersecting a swinging direction of said suspension main body is inputted to said suspension main body,
   wherein said first region is a non-end portion of said suspension arm main body in a substantially longitudinal direction of the vehicle.

15. A suspension arm according to claim 14, wherein said suspension arm main body has an arm portion which is disposed so as to be swingable around an axis extending along the substantially longitudinal direction of the vehicle and whose longitudinal direction is a direction intersecting the substantially longitudinal direction of the vehicle, and said first region is included at said arm portion.

16. A suspension arm according to claim 14, wherein a cross-sectional configuration, in a transverse direction of said arm portion, of a portion of said arm portion which portion includes said first region is one of a substantially C-shaped configuration and a substantially horseshoe-shaped configuration.

17. A suspension arm according to claim 15, wherein a cross-sectional configuration, in a transverse direction of said arm portion, of a portion of said arm portion which portion includes said first region is one of a substantially C-shaped configuration and a substantially horseshoe-shaped configuration.

18. A suspension arm according to claim 14, wherein a cross-sectional configuration of the arm in said region at which a maximum stress is generated is a generally rectangular configuration.

19. A suspension arm according to claim 15, wherein a cross-sectional configuration of the arm in said region at which a maximum stress is generated is a generally rectangular configuration.

20. A suspension arm according to claim 14, wherein an end portion of said suspension arm main body is bent toward another region of said suspension arm main body.

21. A suspension arm according to claim 15, wherein an end portion of said suspension arm main body is bent toward another region of said suspension arm main body.

22. A suspension arm according to claim 20, wherein said end portion is adjacent to said another region of said arm portion.

23. A suspension arm according to claim 21, wherein said end portion is adjacent to said another region of said arm portion.

24. A suspension arm according to claim 22, wherein said end portion is connected to said another region.

25. A suspension arm according to claim 23, wherein said end portion is connected to said another region.

26. A suspension arm according to claim 24, wherein said cross-sectional configuration of the arm in said region at which a maximum stress is generated has a flat portion and a round portion which ranges an end of said flat portion.

27. A suspension arm according to claim 23, wherein said cross-sectional configuration of the arm in said region at which a maximum stress is generated has a flat portion and a round portion which ranges an end of said flat portion.

28. A suspension arm according to claim 24, wherein said cross-sectional configuration of the arm in said region at which a maximum stress is generated has a flat portion and a round portion which ranges an end of said flat portion.

29. A suspension arm according to claim 25, wherein said cross-sectional configuration of the arm in said region at which a maximum stress is generated has a flat portion and a round portion which ranges an end of said flat portion.

30. A suspension arm according to claim 14, wherein said non-end portion is an intermediate portion, in a transverse direction of said arm portion, of said arm portion.

31. A suspension arm according to claim 15, wherein said non-end portion is an intermediate portion, in a transverse direction of said arm portion, of said arm portion.

32. A suspension arm comprising:
   a suspension arm main body formed by curling-working a plate-shaped member; and
   an arm portion forming a portion of said suspension arm main body, said arm portion having a first region which includes a region at which a maximum stress is generated in a case in which, while a vehicle is traveling, a load in a substantially longitudinal direction of the vehicle is inputted to said suspension arm main body,
   wherein said first region is a non-end portion of said arm portion in a transverse direction of said arm portion.

33. A suspension arm according to claim 32, wherein said non-end portion is a curved portion which curves toward an inner side of said arm portion in the transverse direction of said arm portion.

34. A suspension arm according to claim 32, wherein a cross-sectional configuration, in the transverse direction of said arm portion, of a portion of said arm portion which portion includes said first region is substantially symmetrical to left and right of a substantially central line of said arm portion in the transverse direction of said arm portion.

35. A suspension arm according to claim 32, wherein said cross-sectional configuration of the arm in said region at which a maximum stress is generated has a flat portion and a round portion which ranges an end of said flat portion.

36. A suspension arm according to claim 35, wherein said flat portion ranges between an upper edge and lower edge of said round portion.

* * * * *